(12) United States Patent
Yeh

(10) Patent No.: US 8,892,814 B2
(45) Date of Patent: Nov. 18, 2014

(54) DATA STORING METHOD, AND MEMORY CONTROLLER AND MEMORY STORAGE APPARATUS USING THE SAME

(75) Inventor: Chih-Kang Yeh, Kinmen County (TW)

(73) Assignee: Phison Electronics Corp., Miaoli (TW)

( * ) Notice: Subject to any disclaimer, the term of this patent is extended or adjusted under 35 U.S.C. 154(b) by 229 days.

(21) Appl. No.: 13/602,204

(22) Filed: Sep. 3, 2012

(65) Prior Publication Data

US 2013/0346675 A1    Dec. 26, 2013

(30) Foreign Application Priority Data

Jun. 22, 2012   (TW) .............................. 101122434 A

(51) Int. Cl.
*G06F 12/00*         (2006.01)

(52) U.S. Cl.
USPC ............................. 711/103; 711/100; 711/154

(58) Field of Classification Search
CPC ........................... G06F 3/0679; G06F 12/0238
USPC .............. 711/100, 103, 154, 200; 365/185.33
See application file for complete search history.

(56) References Cited

U.S. PATENT DOCUMENTS

| 5,375,222 | A  | * | 12/1994 | Robinson et al. | ............. 711/103 |
| 6,845,438 | B1 | * | 1/2005  | Tanaka et al.   | ................. 711/206 |
| 7,552,311 | B2 | * | 6/2009  | Hara et al.     | .................... 711/213 |
| 8,463,825 | B1 | * | 6/2013  | Harty et al.    | .................... 707/813 |

\* cited by examiner

*Primary Examiner* — Tuan Thai
(74) *Attorney, Agent, or Firm* — Jianq Chyun IP Office

(57) ABSTRACT

A data storing method for a rewritable non-volatile memory module is provided. The method includes dividing logical addresses into a plurality of logical zones, and respectively establishing a plurality of logical address mapping tables for the logical zones. The method also includes writing data of a logical address into a physical program unit; and recording a mapping record indicating the logical address is mapped to the physical program unit in a temp mapping table. The method further includes: if the temp mapping table is full, updating the mapping relations between the logical addresses and the physical program units in the logical address mapping tables based on mapping records recorded in the temp mapping table, and deleting the mapping records in the temp mapping table.

25 Claims, 16 Drawing Sheets

| Logical address index | Physical address |
|---|---|
| LBA(0) | NULL |
| LBA(1) | PBA(0-1) |
| LBA(2) | NULL |
| ⋮ | ⋮ |
| LBA(128) | NULL |
| LBA(129) | PBA(0-2) |
| LBA(130) | NULL |
| ⋮ | ⋮ |
| LBA(Z) | NULL |

FIG. 10

| Logical address index | Physical address |
|---|---|
| LBA(0) | NULL |
| LBA(1) | PBA(0-3) |
| LBA(2) | NULL |
| ⋮ | ⋮ |
| LBA(128) | NULL |
| LBA(129) | PBA(0-2) |
| LBA(130) | NULL |
| ⋮ | ⋮ |
| LBA(Z) | NULL |

FIG. 11

| 1202 ↓ | 1204 ↓ |
|---|---|
| Physical address index | Status |
| PBA(0-1) | 0 |
| PBA(0-2) | 1 |
| PBA(0-3) | 1 |
| PBA(0-4) | 0 |
| ⋮ | ⋮ |
| PBA(N-K) | 0 |

| 1302 ↓ | 1304 ↓ |
|---|---|
| Physical address index | Logical address |
| NULL | NULL |
| NULL | NULL |
| ⋮ | ⋮ |
| NULL | NULL |

| Physical address index | Logical address |
|---|---|
| PBA(0-1) | LBA(3) |
| PBA(0-2) | LBA(Z+4) |
| PBA(0-3) | LBA(2) |
| PBA(0-4) | LBA(Z+2) |
| PBA(0-5) | LBA(Z+1) |
| PBA(0-6) | LBA(10) |
| PBA(0-7) | LBA(Z+3) |

| Physical address index | Logical address |
|---|---|
| PBA(0-1) | LBA(3) |
| PBA(0-3) | LBA(2) |
| PBA(0-6) | LBA(10) |
| PBA(0-2) | LBA(Z+4) |
| PBA(0-4) | LBA(Z+2) |
| PBA(0-5) | LBA(Z+1) |
| PBA(0-7) | LBA(Z+3) |

| Physical address index | Logical address |
|---|---|
| LBA(0) | NULL |
| LBA(1) | NULL |
| LBA(2) | PBA(0-3) |
| LBA(3) | PBA(0-1) |
| LBA(4) | NULL |
| ⋮ | ⋮ |
| LBA(9) | NULL |
| LBA(10) | PBA(0-6) |
| LBA(11) | NULL |
| ⋮ | ⋮ |
| LBA(Z) | NULL |

FIG. 22

| Physical address index | Logical address |
|---|---|
| LBA(Z+1) | PBA(0-5) |
| LBA(Z+2) | PBA(0-4) |
| LBA(Z+3) | PBA(0-7) |
| LBA(Z+4) | PBA(0-2) |
| LBA(Z+5) | NULL |
| ⋮ | ⋮ |
| LBA(P) | NULL |

| Physical address index | Status |
|---|---|
| PBA(0-1) | 1 |
| PBA(0-2) | 1 |
| PBA(0-3) | 1 |
| PBA(0-4) | 1 |
| PBA(0-5) | 1 |
| PBA(0-6) | 1 |
| PBA(0-7) | 1 |
| PBA(0-8) | 0 |
| ⋮ | ⋮ |
| PBA(N-K) | 0 |

| | |
|---|---|
| S2501 | Cofiguring a plurality of logical addresses and dividing the logical addresses into a plurality of logical zones |
| S2503 | Respectively establishing a plurality of logical address mapping tables for the plurality of logical zones |
| S2505 | Establishing a physical address information table for the physical program units of the Physical erase unit in the memory storage apparatus |
| S2507 | Establishing a temp mapping table for recording the mapping relations of a potion of the physical program units |

FIG. 25

DATA STORING METHOD, AND MEMORY CONTROLLER AND MEMORY STORAGE APPARATUS USING THE SAME

CROSS-REFERENCE TO RELATED APPLICATION

This application claims the priority benefit of Taiwan application serial no. 101122434, filed on Jun. 22, 2012. The entirety of the above-mentioned patent application is hereby incorporated by reference herein and made a part of this specification.

BACKGROUND

1. Technical Field

The present invention relates to a data storing method for a non-volatile memory module and a memory controller and a memory storage apparatus using the same.

2. Description of Related Art

The growth of digital cameras, mobile phones, and MP3 players has been rapid in recent years. Consequently, the consumers' demand for storage media has increased tremendously. Rewritable non-volatile memory is one of the most adaptable memories for portable electronic products such as laptop computer due to its data non-volatility, low power consumption, small volume, non-mechanical structure and high read/write speed. A solid state drive is a storage apparatus adopting flash memory as storage medium. For these reasons, flash memory has become an important part of the electronic industries.

Generally, a flash memory module of a flash memory storage apparatus is divided into a plurality of physical blocks, in which the physical blocks are further divided into a plurality of physical pages. In the flash memory, the physical block is an erasing unit and the physical page is a writing unit. Since only unidirectional programming (i.e. by programming the value of the memory cell from 1 to 0) may be performed to programming memory cells of the flash memory, a direct writing to a programmed physical page (i.e. page that is stored with old data) may not be performed before such physical page has been erased for re-programming. In particular, since the physical block is used as a unit for erasing in the flash memory, when an erasing operation is performed to the physical page stored with old data, the physical block that contains the physical page is erased entirely. Therefore, the physical blocks of the flash memory module are divided into a data area and a spare area, in which the physical blocks in the data area are physical blocks that already stored with data and the physical blocks in the spare area are physical block not being used. When the host system is writing data to the flash memory, the control circuit of the flash memory storage apparatus selects a physical block from the spare area for writing data and associates the selected physical blocks with the data area. In addition, after an erasing operation to the physical blocks of the data area is performed, the erased physical blocks are associated with the spare area.

In the host system, a writing operation is performed through logical addresses, and a sequence for writing data to the logical addresses may not always in accordance to an order of the logical addresses. Base on the above, how to effectively recording mapping relations between the logical addresses and the physical blocks to increase the speed for storing data is one of the major subjects in the industry.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The present invention is directed to a data storing method, memory controller and memory storage apparatus using the same, which may effectively increase the performance of the writing operation.

In an exemplary embodiment of the present invention, a data storing method for a rewritable non-volatile memory module is provided, wherein the rewritable non-volatile memory module has a plurality of physical erase units, and each of the physical erase units has a plurality of physical program units. The data storing method includes: configuring a plurality of logical addresses, and dividing the logical addresses into a plurality of logical zones. The data storing method also includes: respectively establishing a plurality of logical address mapping tables for the logical zones, in which each logical zone is corresponding to one logical address mapping table. The data storing method also includes: receiving data from a host system, in which the data is stored to a first logical address according to an instruction of the host system. The data storing method further includes: writing data to a first physical program unit; recording a mapping record indicating that the first logical address is mapped to the first physical program unit in a temp mapping table; and determining whether the temp mapping table is full. The data storing method further includes: if the temp mapping table is full, updating mapping relations between the logical addresses and the physical program units of the physical erase units in the plurality of logical address mapping tables based on a plurality of mapping records recorded in the temp mapping table, and deleting the plurality of mapping records recorded in the temp mapping table, in which the mapping relations of a portion of the physical program units are recorded in the temp mapping table.

In an exemplary embodiment of the present invention, a data storing method for a rewritable non-volatile memory module is provided, wherein the rewritable non-volatile memory module has a plurality of physical erase units, and each of the physical erase units has a plurality of physical program units. The data storing method includes: configuring a plurality of logical addresses, and dividing the logical addresses into a plurality of logical zones. The data storing method also includes: respectively establishing a plurality of logical address mapping tables for the logical zones, in which each logical zone is corresponding to one logical address mapping table. The data storing method also includes: receiving data from a host system, in which data is stored to a first logical address according to an instruction of the host system. The data storing method further includes: writing the data into a first physical program unit; and determining whether the logical address mapping table corresponding to the logical zone of the first logical address is loaded to a buffer memory. The data storing method also includes: if the logical address mapping table corresponding to the logical zone of the first logical address is loaded to the buffer memory, recording a mapping record indicating that the first logical address is mapped to the first physical program unit in the logical address mapping table corresponding to the logical zone of the first logical address; and if the logical address mapping table corresponding to the logical zone of the first logical address is not loaded to the buffer memory, recording the mapping record indicating that the first logical address is mapped to the first physical program unit in a temp mapping table; The data storing method also includes: determining whether the temp mapping table is full; and if the temp mapping table is full, updating mapping relations between the logical addresses and the physical program units in the logical address mapping tables, and deleting mapping records in the temp mapping table, in which the mapping relations of a portion of the physical program units are recorded in the temp mapping table.

In an exemplary embodiment of the present invention, a memory controller for controlling a rewritable non-volatile memory module is provided, the rewritable non-volatile memory module has a plurality of physical erase units, and each of the physical erase units has a plurality of physical program units. The memory controller includes a host interface, a memory interface and a memory management circuit. The host interface is configured to couple to a host system. The memory interface is configured to couple to the rewritable non-volatile memory module. The memory management circuit is coupled to the host interface and the memory interface. The memory management circuit is configured to configure a plurality of logical addresses, and divide the plurality of logical addresses into a plurality of logical zones, and respectively establish a plurality of logical address mapping tables for the plurality of logical zones, wherein each of the logical zones is corresponding to one logical address mapping table. In addition, the memory management circuit is further configured to receive data from the host system, in which the data is stored to a first logical address according to an instruction of the host system. The memory management circuit is further configured to write the data into a first physical program unit, and record a mapping record indicating that the first logical address is mapped to the first physical program unit in a temp mapping table. In addition, the memory management circuit is further configured to determine whether the temp mapping table is full. If the temp mapping table is full, the memory management circuit is further configured to update mapping relations between the logical addresses and the physical program units in the logical address mapping tables, and delete mapping records in the temp mapping table. In this case, the mapping relations of a portion of the physical program units are recorded in the temp mapping table.

In an exemplary embodiment of the present invention, a memory controller for controlling a rewritable non-volatile memory module is provided, wherein the rewritable non-volatile memory module has a plurality of physical erase units, and each of the physical erase units has a plurality of physical program units. The memory controller includes a buffer memory, a host interface, a memory interface and a memory management circuit. The host interface is configured to couple to a host system. The memory interface is configured to couple to the rewritable non-volatile memory module. The memory management circuit is coupled to the buffer memory, the host interface and the memory interface. In this case, the memory management circuit is configured to configure a plurality of logical addresses, and divide the plurality of logical addresses into a plurality of logical zones, and respectively establish a plurality of logical address mapping tables for the plurality of logical zones, wherein each of the logical zones is corresponding to one logical address mapping table. In addition, the memory management circuit is further configured to receive data from the host system, in which data is stored to a first logical address according to an instruction of the host system. In addition, the memory management circuit is further configured to write the data to a first physical program unit, and determine whether the logical address mapping table corresponding to the logical zone of the first logical address is loaded to the buffer memory. If the logical address mapping table corresponding to the logical zone of the first logical address is loaded to the buffer memory, the memory management circuit is further configured to record a mapping record indicating that the first logical address is mapped to the first physical program unit in the logical address mapping table corresponding to the logical zone of the first logical address. If the logical address mapping table corresponding to the logical zone of the first logical address is not loaded to the buffer memory, the memory management circuit is further configured to record the mapping record indicating that the first logical address is mapped to the first physical program unit in a temp mapping table. Moreover, the memory management circuit is further configured to determine whether the temp mapping table is full. If the temp mapping table is full, the memory management circuit is configured to update the mapping relations between the logical addresses and the physical program units in the logical address mapping tables, and delete mapping records in the temp mapping table. In this case, the mapping relations of a portion of the physical program units are recorded in the temp mapping table.

In an exemplary embodiment of the present invention, a memory storage apparatus including a connector, a rewritable non-volatile memory module and a memory controller is provided. The connector is configured to couple to a host system. The rewritable non-volatile memory module, having a plurality of physical erase units, wherein each of the physical erase units has a plurality of physical program units. The memory controller is coupled to the connector and the rewritable non-volatile memory module. The memory controller is configured to configure a plurality of logical addresses, and divide the plurality of logical addresses into a plurality of logical zones, and respectively establish a plurality of logical address mapping tables for the plurality of logical zones, wherein each of the logical zones is corresponding to one logical address mapping table. In addition, the memory controller is further configured to receive data from the host system, in which the data is stored to a first logical address according to an instruction of the host system. And, the memory controller is further configured to write the data to a first physical program unit, and recording a mapping record indicating that the first logical address is mapped to the first physical program unit in a temp mapping table. In addition, the memory controller is further configured to determine whether the temp mapping table is full. If the temp mapping table is full, the memory controller is configured to update the mapping relations between the logical addresses and the physical program units in the logical address mapping tables, and delete mapping records in the temp mapping table. In this case, the mapping relations of a portion of the physical program units are recorded in the temp mapping table.

In an exemplary embodiment of the present invention, a memory storage apparatus including a connector, a rewritable non-volatile memory module and a memory controller is provided. The connector is configured to couple to a host system. The rewritable non-volatile memory module, having a plurality of physical erase units, wherein each of the physical erase units has a plurality of physical program units. The memory controller is coupled to the connector and the rewritable non-volatile memory module, and having a buffer memory. In this case, the memory controller is configured to configure a plurality of logical addresses, and divide the plurality of logical addresses into a plurality of logical zones, and respectively establish a plurality of logical address mapping tables for the plurality of logical zones, wherein each of the logical zones is corresponding to one logical address mapping table. In addition, the memory controller is further to receive data from the host system, in which data is stored to a first logical address according to an instruction of the host system. In addition, the memory controller is further configured to write the data into a first physical program unit, and determine whether the logical address mapping table corresponding to the logical zone of the first logical address is loaded to the buffer memory. If the logical address mapping table corresponding to the logical zone of the first logical address is loaded to the buffer memory, the memory controller is further configured to recording a mapping record indicating that the first logical address is mapped to the first physical program unit in the logical address mapping table corresponding to the logical zone of the first logical address. If the logical address mapping table corresponding to the logical zone of the first logical address is not loaded to the buffer memory, the memory controller is further configured to recording the mapping record indicating that the first logical address is mapped to the first physical program unit in a temp mapping table. Moreover, the memory controller is further configured to determine whether the temp mapping table is full. If the temp mapping table is full, the memory controller is further configured to update mapping relations between the logical addresses and the physical program units in the logical address mapping tables, and delete mapping records in the temp mapping table. In this case, the temp mapping table records the mapping relations of a portion of the physical program units.

As described above, a data storing method, and a memory controller and a memory storage apparatus using the same in exemplary embodiments of the invention may effectively reduce times of switching the mapping table, thereby reducing the required time for writing operation.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

To make the aforementioned and other features and advantages of the invention more comprehensible, several embodiments accompanied with figures are described in detail below.

BRIEF DESCRIPTION OF THE DRAWINGS

FIGS. 9 to 11 are schematic diagram illustrating an example of a writing operation for updating the logical address mapping table according to an exemplary embodiment of the present invention.

FIG. 12 is a schematic diagram illustrating a physical address storage status table according to an exemplary embodiment of the present invention.

FIG. 13 is a schematic diagram illustrating a temp mapping table according to an exemplary embodiment of the present invention.

FIGS. 14 to 20 are schematic diagrams illustrating a updating operation of the temp mapping table when writing multiple data from a host system according to an exemplary embodiment of the present invention.

FIGS. 21 to 24 are schematic diagrams illustrating a deleting operation of a temp mapping table according to an exemplary embodiment of the present invention.

FIG. 25 is a flowchart illustrating an initialization of the memory storage apparatus in the data storing method according to an exemplary embodiment of the present invention.

DESCRIPTION OF THE EMBODIMENTS

Figure 1:
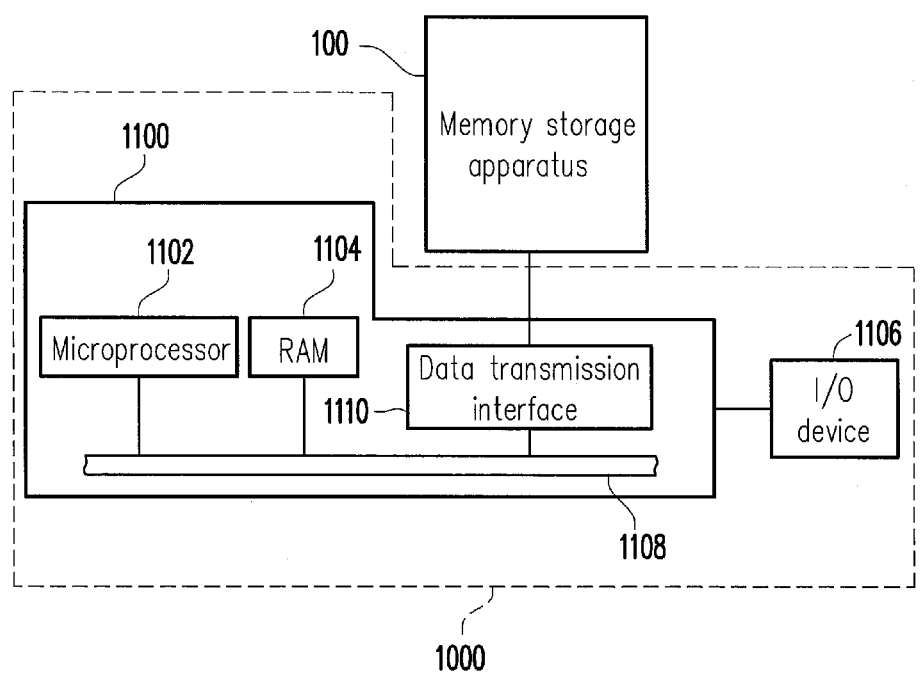
FIG. 1 is a diagram of a host system and a memory storage apparatus according to an exemplary embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally, a memory storage apparatus (a.k.a. the memory storage system) includes a rewritable non-volatile memory module and a controller (a.k.a. the control circuit). The memory storage apparatus is usually used together with a host system so that the host system may write data into or read data from the memory storage apparatus.

FIG. 1 is a diagram of a host system and a memory storage apparatus according to an exemplary embodiment of the invention.

Figure 2:
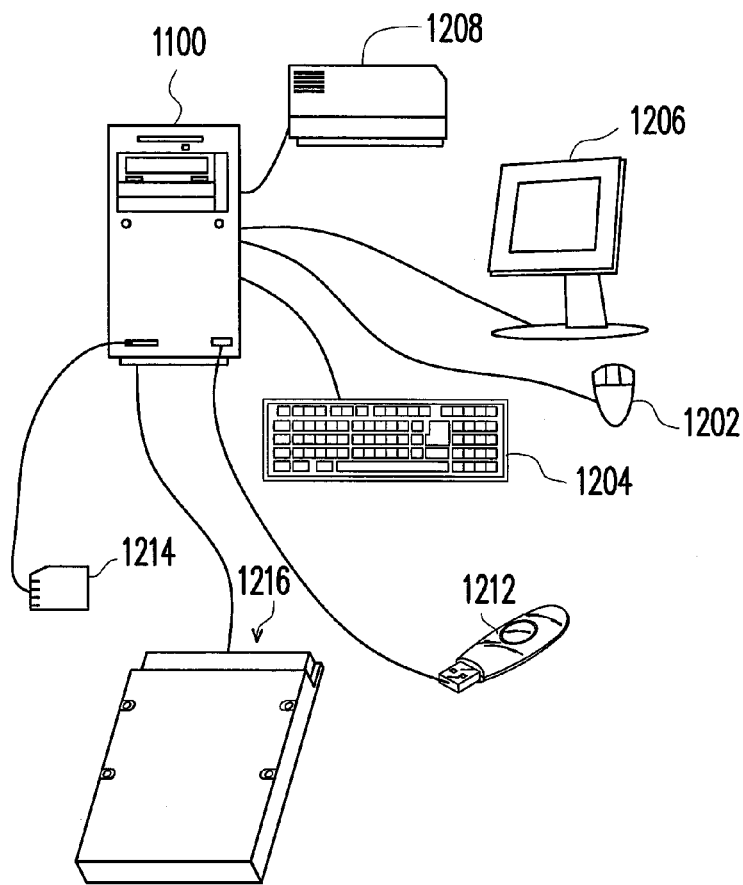
FIG. 2 is a schematic diagram illustrating a computer, an input/output device and a memory storage apparatus according to an exemplary embodiment of the present invention.

Referring to FIG. 1, a host system 1000 includes a computer 1100 and an input/output (I/O) device 1106. The computer 1100 includes a microprocessor 1102, a random access memory (RAM) 1104, a system bus 1108, and a data transmission interface 1110. For example, the I/O device 1106 includes a mouse 1202, a keyboard 1204, a display 1206 and a printer 1252 as shown in FIG. 2. It should be understood that the devices illustrated in FIG. 2 are not intended to limit the I/O device 1106, and the I/O device 1106 may further include other devices.

In the embodiment of the invention, the memory storage apparatus 100 is coupled to the devices of the host system 1000 through the data transmission interface 1110. By using the microprocessor 1102, the random access memory (RAM) 1104 and the Input/Output (I/O) device 1106, data may be written into the memory storage apparatus 100 or may be read from the memory storage apparatus 100. For example, the memory storage apparatus 100 may be a rewritable non-volatile memory storage device such as a flash drive 1256, a memory card 1214, or a solid state drive (SSD) 1216 as shown in FIG. 2.

Figure 3:
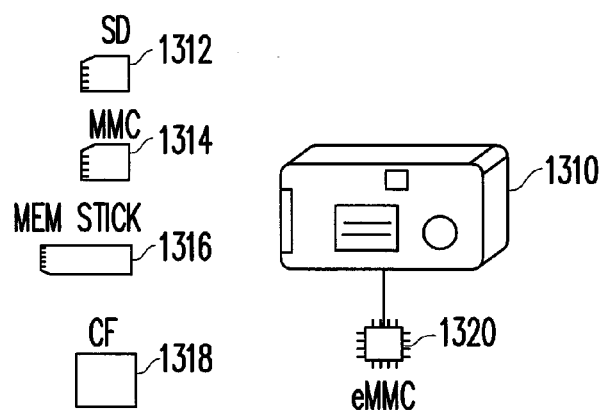
FIG. 3 is a schematic diagram of a host system and a memory storage apparatus according to an exemplary embodiment of the present invention.

Generally, the host system 1000 may substantially be any system capable of storing data with the memory storage apparatus 100. Although the host system 1000 is described as a computer system in the present exemplary embodiment, in another exemplary embodiment of the invention, the host system 1000 may be a digital camera, a video camera, a telecommunication device, an audio player, or a video player. For example, if the host system is a digital camera (video camera) 1310, the rewritable non-volatile memory storage device may be a SD card 1312, a MMC card 1314, a memory stick 1316, a CF card 1318 or an embedded storage device 1320 (as shown in FIG. 3). The embedded storage device 1320 includes an embedded MMC (eMMC). It should be mentioned that the eMMC is directly coupled to a substrate of the host system.

Figure 4:
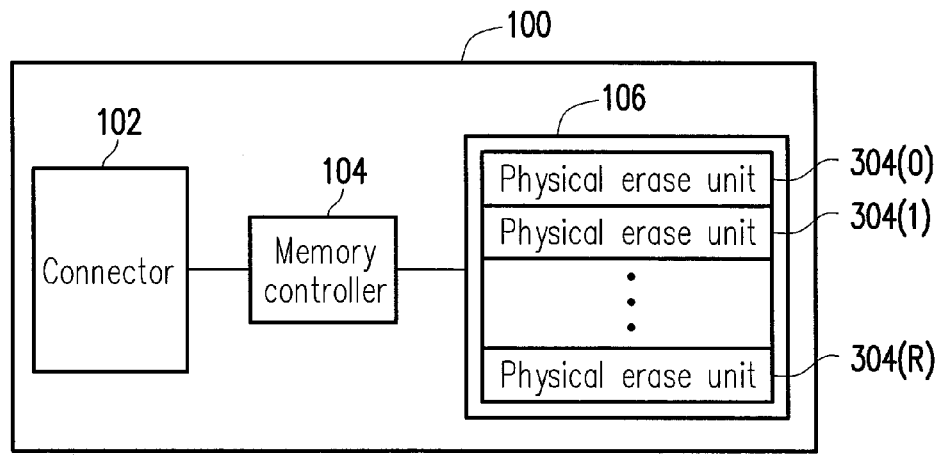
FIG. 4 is a schematic block diagram of the memory storage apparatus in FIG. 1.

FIG. 4 is a schematic block diagram of the memory storage apparatus in FIG. 1.

Referring to FIG. 4, the memory storage apparatus 100 includes a connector 102, a memory controller 104 and a rewritable non-volatile memory module 106.

In the present exemplary embodiment, the connector 102 is compatible to a serial advanced technology attachment (SATA) standard. However, the present invention is not limited thereto, and the connector 102 may also be compatible to a Parallel Advanced Technology Attachment (PATA) standard, an Institute of Electrical and Electronic Engineers (IEEE) 1394 standard, a peripheral component interconnect (PCI) Express interface standard, a universal serial bus (USB) standard, a secure digital (SD) interface standard, a Ultra High Speed-I (UHS-I) interface standard, a Ultra High Speed-II (UHS-II) interface standard, a memory stick (MS) interface standard, a multi media card (MMC) interface standard, an embedded MMC (eMMC) interface standard, a Universal Flash Storage (UFS) interface standard, a compact flash (CF) interface standard, an integrated device electronics (IDE) interface standard or other suitable standards.

The memory controller 104 is configured to execute a plurality of logic gates or control commands which are implemented in a hardware form or in a firmware form, so as to perform operations of writing, reading or erasing data in the rewritable non-volatile memory module 106 according to the commands of the host 1000.

The rewritable non-volatile memory module 106 is coupled to the memory controller 104 and configured to store data written from the host system 1000. The rewritable non-volatile memory module 106 has multiple physical erase units 304(0) to 304(R). For example, the physical erase units 304(0) to 304(R) may belong to the same memory die or belong to different memory dies. Each physical erase unit has a plurality of physical program units, and the physical program units of the same physical erase unit may be may be written separately and erased simultaneous. For example, each physical erase unit is composed by 128 physical program units. Nevertheless, it should be understood that the invention is not limited thereto. Each physical erase unit may also be composed by 64 physical program units, 256 physical program units or any amount of the physical program units.

More specifically, the physical erase unit is the smallest unit for erasing. Namely, each physical erase unit contains the least number of memory cells to be erased together. The physical program unit is the smallest unit for programming. That is, the programming unit is the smallest unit for writing data. Each physical program unit usually includes a data bits area and a redundancy bits area. The data bits area having multiple physical access address is used to store user data, and the redundant bit area is used to store system data (for example, control information and error checking and correcting code). In the present exemplary embodiment, each data bit area of the physical program unit contains 4 physical access addresses, and the size of each physical access address is 512 bytes. However, in other exemplary embodiments, more or less number of the physical address may be contained in the data bit area, amount and size of the physical access address are not limited in the invention. For example, in an exemplary embodiment, the physical erase unit is a physical block, and the physical program unit is a physical page or a physical sector, but the invention is not limited thereto.

In the present exemplary embodiment, a rewritable non-volatile memory module 106 is a Multi Level Cell (MLC) NAND flash memory module which stores at least 2 bits of data in one cell. However, the invention is not limited thereto. The rewritable non-volatile memory module 106 may also be a Trinary Level Cell (TLC) NAND flash memory module, other flash memory module or other memory module having the same feature.

Figure 5:
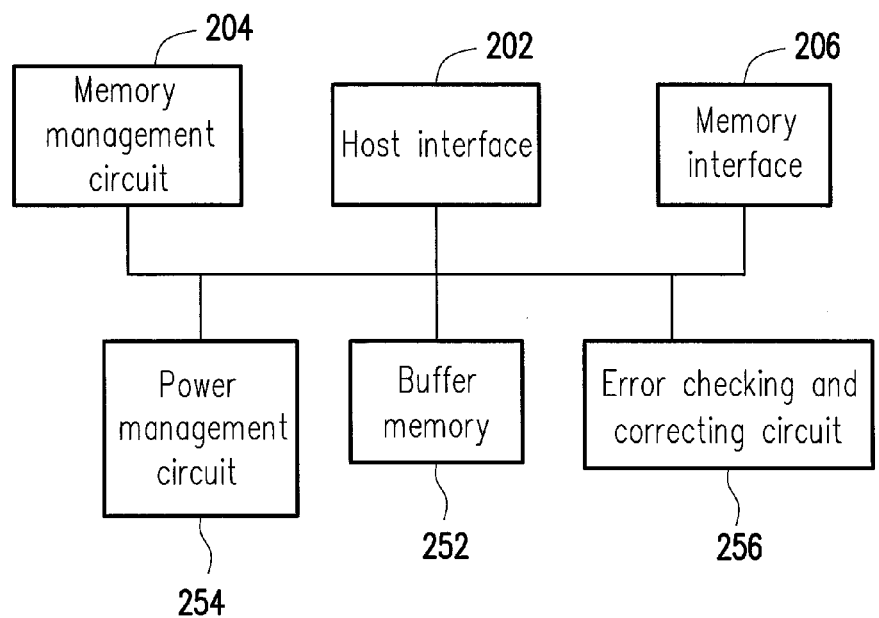
FIG. 5 is a schematic block diagram of a memory controller according to an exemplary embodiment of the present invention.

FIG. 5 is a schematic block diagram of a memory controller according to an exemplary embodiment of the invention. It should be understood that, the structure of the memory controller as shown in FIG. 5 is only an example, and the present invention is not limited thereto.

Referring to FIG. 5, the memory controller 104 includes a memory management circuit 202, a host interface 204 and a memory interface 206.

The memory management circuit 202 is configured to control the overall operations of the memory controller 104. More specifically, the memory management circuit 202 has a plurality of control instructions, and when the memory storage apparatus 100 is operated, the control commands are executed to perform an operation, such as data writing, data reading and data erasing.

In the present exemplary embodiment, the control instructions of the memory management circuit 202 are implemented in a form of a firmware. For example, the memory management circuit 202 has a microprocessor unit (not illustrated) and a ROM (not illustrated), and the control instructions are burn into the ROM. During the operation of the memory storage apparatus 100, the control commands are executed by the microprocessor unit to perform operations of writing, reading or erasing data.

In another exemplary embodiment of the present invention, the control instructions of the memory management circuit 202 may also be stored as program codes in a specific area (for example, the system area in a memory module exclusively used for storing system data) of the rewritable non-volatile memory module 106. In addition, the memory management circuit 202 has a microprocessor unit (not illustrated), a ROM (not illustrated) and a RAM (not illustrated). In particular, the ROM has an boot code, which is executed by the microprocessor unit to load the control instructions stored in the rewritable non-volatile memory module 106 to the RAM of the memory management circuit 202 when the memory controller 104 is enabled. Next, the control instructions are executed by the microprocessor unit to perform operations of writing, reading or erasing data.

Further, in another exemplary embodiment of the invention, the control commands of the memory management circuit 202 may also be implemented in a form of a hardware. For example, the memory management circuit 202 includes a microprocessor, unit a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the microprocessor unit. Wherein, the memory management circuit is configured for managing the physical erase unit of the rewritable non-volatile memory module 106; the memory writing circuit is configured for providing a writing command to the rewritable non-volatile memory module 106, thereby writing data into the rewritable non-volatile memory module 106; the memory reading circuit is configured for providing a reading command to the rewritable non-volatile memory module 106, thereby reading data from the rewritable non-volatile memory module 106; the memory erasing circuit is configured for providing a erasing command to the rewritable non-volatile memory module 106, thereby erasing data from the rewritable non-volatile memory module 106; and the memory processing circuit is configured for processing data to be written into the rewritable non-volatile memory module 106 and data read from the rewritable non-volatile memory module 106.

The host interface 204 is coupled to the memory management circuit 202 and configured to receive and identify commands and data sent from the host system 1000. Namely, the commands and data sent from the host system 1000 are passed to the memory management circuit 202 through the host interface 204. In the present exemplary embodiment, the host interface 204 is compatible to a SATA standard. However, it is to be understood that the invention is not limited thereto. The host interface 204 may also be a PATA standard, an IEEE 1394 standard, a PCI Express standard, a USB standard, a SD standard, a UHS-I interface standard, a UHS-II interface standard, a MS standard, a MMC standard, an eMMC interface standard, a UFS interface standard, a CF standard, an IDE standard, or other suitable standards for data transmission.

The memory interface 206 is coupled to the memory management circuit 202 and configured for accessing the rewritable non-volatile memory module 106. That is, data to be written to the rewritable non-volatile memory module 106 is converted to a format acceptable to the rewritable non-volatile memory module 106 through the memory interface 206.

In an exemplary embodiment of the invention, the memory controller 104 further includes a buffer memory 252, a power management circuit 254 and an error checking and correcting circuit 256.

The buffer memory 252 is coupled to the memory management circuit 202 and configured to temporarily store data and commands from the host system 1000 or data from the rewritable non-volatile memory module 106.

The power management unit 254 is coupled to the memory management circuit 202 and configured to control the power of the memory storage apparatus 100.

The error checking and correcting circuit 256 is coupled to the memory management circuit 202 and configured to perform an error checking and correcting process to ensure the correctness of data. Specifically, when the memory management circuit 202 receives a writing command from the host system 1000, the error checking and correcting circuit 256 generates an error checking and correcting code (ECC code) for data corresponding to the writing command, and the memory management circuit 202 writes data and the ECC code corresponding to the writing command into the rewritable non-volatile memory module 106. Next, when reading data from the rewritable non-volatile memory module 106, the memory management circuit 202 also reads the ECC Code corresponding to such data, and the error checking and correcting circuit 256 performs an error checking and correcting process on the read data based on the read ECC code.

Figure 6:
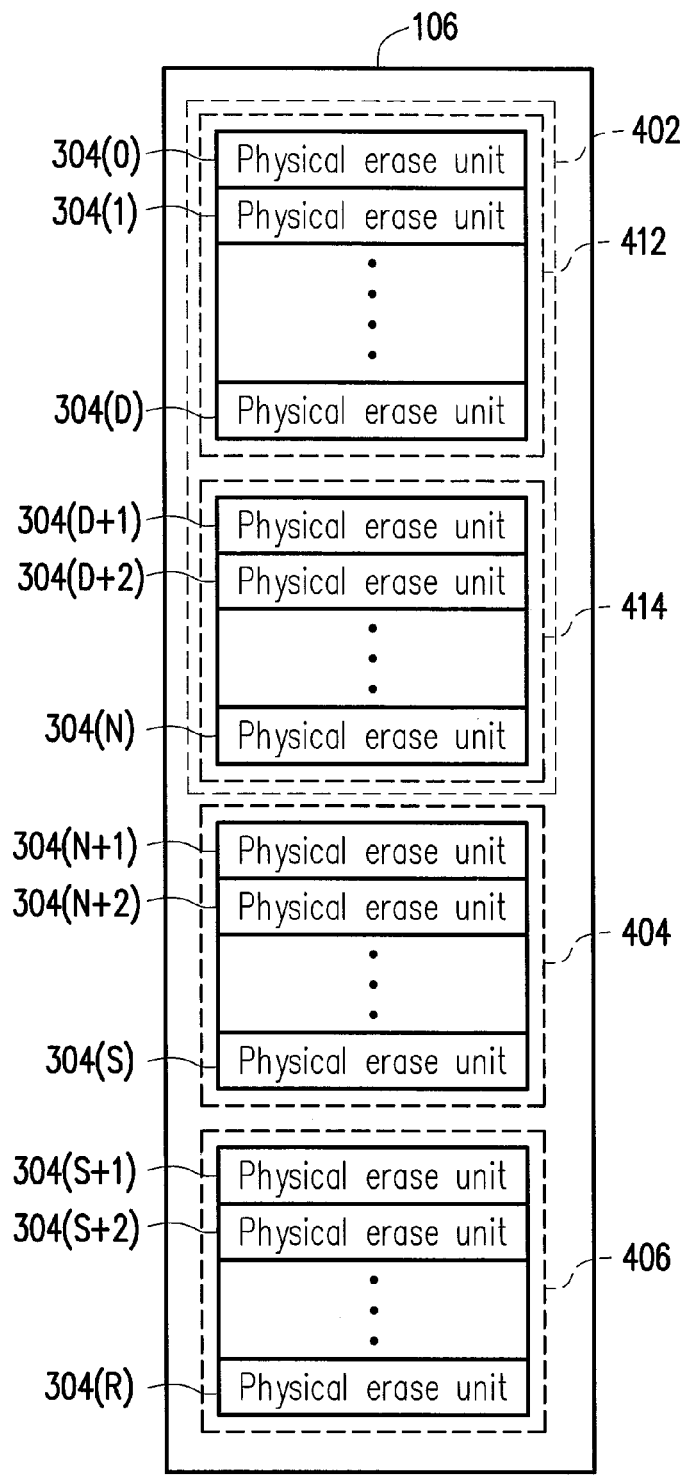
FIG. 6 and FIG. 7 are schematic diagrams illustrating management of a rewritable non-volatile memory module according to an exemplary embodiment of the present invention.
Figure 7:
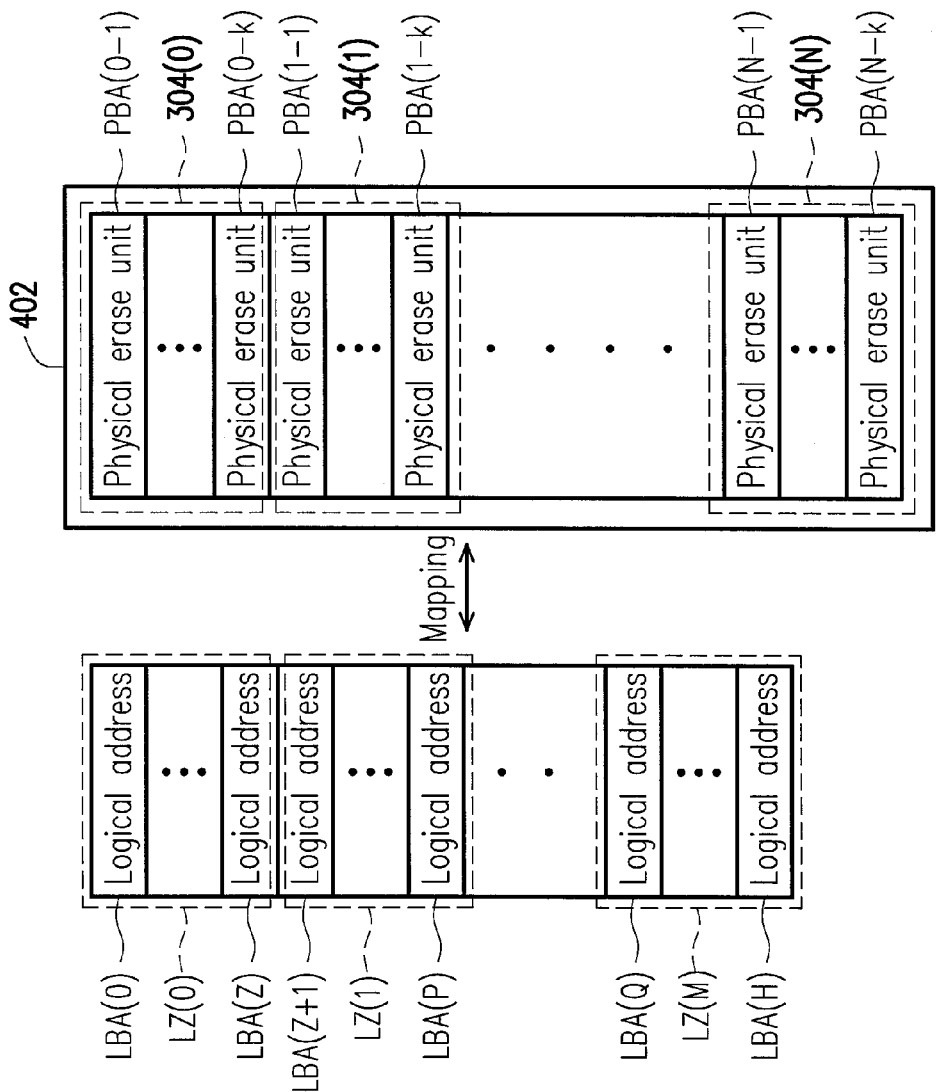

FIG. 6 and FIG. 7 are schematic diagrams illustrating management of a rewritable non-volatile memory module according to an exemplary embodiment of the present invention.

It should be understood that terms, such as "get", "select", "replace", "group", and "alternate" and so forth, are logical concepts which describe operations in the physical erase units of the rewritable non-volatile memory module 106. Namely, the actual positions of the physical erase units in the rewritable non-volatile memory module are not changed. Instead, operations in the physical earing units of the rewritable non-volatile memory module are only logically performed.

Referring to FIG. 6, the memory controller 104 (or the memory management circuit 202) may logically group the physical erase units 304(0) to 304(R) of the rewritable non-volatile memory module 106 into a storage area 402, a system area 404 and a replacement area 406.

Logically, the physical erase units belonging to the storage area 402 is used for storing data written from the host system 1000. Namely, the memory storage apparatus 100 practically stores data written from the host system 1000 by using physical erase units grouped as the storage area 402.

The physical erase units logically belonging to the system area 404 are used for recording system information, which includes information related to manufacturer and model of a memory chip, the number of physical erase units in the memory chip, the number of the physical program unit in each physical erase unit, and so forth.

The physical erase units logically belonging to the replacement area 406 are replacement physical erase units. For example, 4% of the physical erase units in the rewritable non-volatile memory module 106 are reserved for replacement during its manufacturing process. That is, when the physical erase units in the storage area 402 and the system area 404 are damaged, the physical erase units reserved in the replacement area 406 are used for replacing the damaged physical erase units (i.e. bad blocks). Thus, if there are still available physical erase units in the replacement area 406 in the case of the physical erase unit being damaged, the memory controller 104 retrieves an available physical erase unit from the replacement area 406 for replacing the damaged physical erase unit. If there is no more available physical erase unit in the replacement area 406 when a physical erase unit is damaged, the memory storage apparatus 100 is announced by the memory controller 104 as being in a write-protect status, and data cannot be written therein.

In particular, the amount of the physical erase units in the storage area 402, the system area 404 and the replacement area 406 may be different according to the different memory specifications used. In addition, it should be understood that, during the operation of the memory storage apparatus 100, grouping relations of the physical erase units related to the storage area 402, the system area 404 and the replacement area 406 may be dynamically changed. For example, when damaged physical erase unit in the storage area 402 are replaced by the physical erase unit in the replacement area

406, the physical erase unit originally from the replacement area 406 is then related to the storage area 402.

Referring to FIG. 7, as described above, the physical erase units of the storage area 402 is used for storing data written from the host system 1000. In the present exemplary embodiment, the memory controller 104 (or the memory management circuit 202) assigns logical addresses LBA(0) to LBA (H) to the host system 1000 for data accessing. Each logical address is composed by several sectors. For example, in the present exemplary embodiment, each logical address is composed by four sectors. However, the present invention is not limited thereto. In another exemplary embodiment of the invention, the logical address may be composed by 8 sectors or 16 sectors. Generally, the amount of the physical program units of the physical erase units in the storage area 402 is larger than the amount of the logical addresses thereto.

For example, when the memory controller 104 (or the memory management circuit 202) stores data written from the host system 1000 by using the physical erase unit 304(0), regardless of which logical address is selected by the host system 1000 for writing, the memory controller 104 (or the memory management circuit 202) writes data into the physical program units of the physical erase unit 304(0); When the memory controller 104 (or the memory management circuit 202) stores data written from the host system 1000 by using the physical erase unit 304(1), regardless of which logical address is selected by the host system 1000 for writing, the memory controller 104 (or the memory management circuit 202) writes data into the physical program units of the physical erase unit 304(1). That is, when data is written from the host system 1000, the memory controller 104 (or the memory management circuit 202) writes data by using physical program units in one physical erase unit. Only when all of the physical program units in such physical erase unit are used, another physical erase unit without storing any data may be then be selected, so that data writing to the physical program units of the newly selected physical erase unit may be continued.

In order to identify where each logical address of data is stored in the physical program unit, in the present exemplary embodiment, the memory controller 104 (or the memory management circuit 202) records mapping relations between the logical addresses and the physical program units. When the host system 1000 accesses data in the sector, the memory controller 104 (or the memory management circuit 202) first confirms the logical address which belongs to such sector and accesses data from the physical program unit mapped with such logical address. For example, in the present exemplary embodiment, the memory controller 104 (or the memory management circuit 202) stores a logical address mapping table in the rewritable non-volatile memory module 106 for recording each physical program unit mapped with the logical address. When accessing to data, the memory controller 104 (or the memory management circuit 202) loads the logical address mapping table to the buffer memory 252 for maintaining.

It should be noted that, due to the limitation of capacity, the buffer memory 252 may not be able to store the mapping tables stored with the mapping relations of all logical addresses. Therefore, in the present exemplary embodiment, the memory controller 104 (or the memory management circuit 202) groups the logical addresses LBA(0) to LBA(H) into a plurality of logical zones LZ(0) to LZ(M), and configuring one logical address mapping table for each logical zone. In particular, when the memory controller 104 (or the memory management circuit 202) updates the mapping relations of certain logical address, the logical address mapping table corresponding to the logical zone of the logical address is loaded to the buffer memory for updating.

Figure 8:
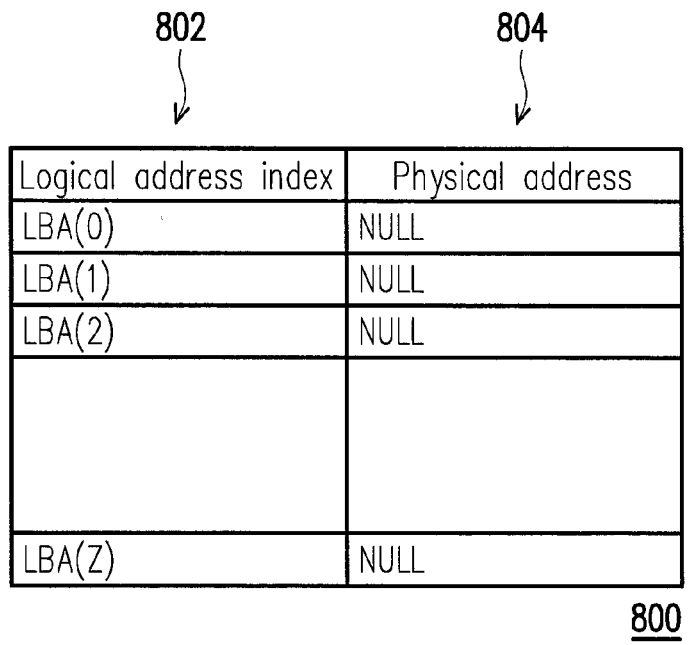
FIG. 8 is a schematic diagram illustrating a logical address mapping table according to an exemplary embodiment of the present invention.

FIG. 8 is a schematic diagram illustrating a logical address mapping table according to an exemplary embodiment of the present invention.

Referring to FIG. 8, in the present exemplary embodiment, the logical address mapping table of each logical zone is identical, a logical address mapping table 800 corresponding to the logical zone LZ(0) is used as a reference for description hereinafter. The logical address mapping table 800 includes a logical address index field 802 and a physical address field 804. The logical address index field 802 records each reference number of the logical address in the logical zone LZ(0) and the physical address field 804 records each physical program unit mapped with the logical address. In the case where the memory storage apparatus 100 is brand new and never used for storing data, each field corresponding to each physical program unit mapped with the logical address in all of the logical address mapping tables is marked as void value (e.g. NULL).

Figure 9:
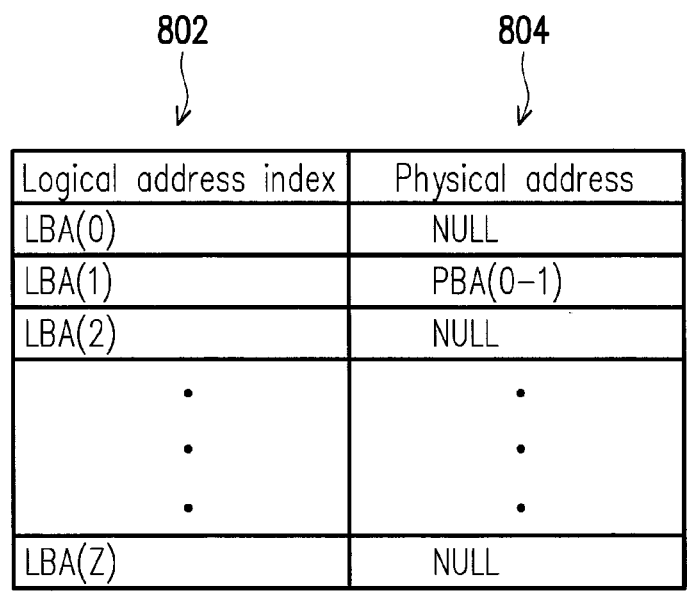

FIGS. 9 to 11 are schematic diagram illustrating an example of a writing operation for updating the logical address mapping table according to an exemplary embodiment of the invention.

Referring to FIG. 9, in the case where the memory storage apparatus 100 is brand new and never used for storing data, when the host system 1000 is writing data into the logical address LBA(1), the memory controller 104 (or memory management circuit 202) selects a physical erase unit (e.g. the physical erase unit 304(0)) and writes data to be written from the host system 1000 into the physical program unit PBA(0-1). After data writing is completed, the memory controller 104 (or the memory management circuit 202) maps the logical address LBA(1) to the physical program unit PBA(0-1) in the logical address mapping table 800.

Referring to FIG. 10, when the host system 1000 is writing data into the logical address LBA(129) in the case of FIG. 9, the memory controller 104 (or the memory management circuit 202) writes data to be written from the host system 1000 into the physical program unit PBA(0-2). In this case, the memory controller 104 (or the memory management circuit 202) maps the logical address LBA(129) to the physical program unit PBA(0-2) in the logical address mapping table 800.

Referring to FIG. 11, when the host system 1000 is writing data into the logical address LBA(1) in the case of FIG. 10, the memory controller 104 (or the memory management circuit 202) writes data to be written from the host system 1000 into the physical program unit PBA(0-3). In this case, the memory controller 104 (or the memory management circuit 202) maps the logical address LBA(1) to the physical program unit PBA (0-3) in the logical address mapping table 800. In this case, data stored in the physical program unit PBA(0-1) is marked as an invalid data. In particular, in the case where all data stored in the physical program unit of certain physical erase unit are marked as invalid data, the memory controller 104 (or the memory management circuit 202) may perform an erasing operation to the physical erase unit, so that the physical erase unit being erased may be re-used for writing data. Accordingly, in order to identify the physical program unit which stored with the invalid data, in the present exemplary embodiment, the memory controller 104 (or the memory management circuit 202) maintains the physical address information table, thereby identifying whether data stored in each physical address is valid data or an invalid data. For example, the memory controller 104 (or the memory management circuit 202) records the status of the physical address using a physical address storage status table.

FIG. 12 is a schematic diagram illustrating a physical address storage status table according to an exemplary embodiment of the present invention.

Referring to FIG. 12, the physical address storage status table 1200 includes a physical address index field 1202 and status field 1204, in which the physical address index field 1202 records each reference number of the physical program units and the status field 1204 records each status corresponding to the physical program units. For example, when the status field is marked as "0", the corresponding data stored in the physical program unit is the invalid data. When the status field is marked as "1", the corresponding data stored in the physical program unit is the valid data. However, the invention is not limited thereto.

It is noted that, besides using the physical address storage status table 1200 to identify the status of the physical address, in another exemplary embodiment of the present invention, the physical address mapping table may also be used to identify the status of the physical address. For example, the physical address mapping table includes a physical address index field and a logical address field, in which the logical address field is configured for recording the logical address mapped with the physical program unit recorded in the physical address index field. Further, by comparing the logical address mapping table and the physical address mapping table, data stored in each physical program unit being the valid data or the invalid data may then be identified.

As a result, during the operation of the memory storage apparatus 100, the logical address mapping tables corresponding to all logical addresses may not be loaded to the buffer memory 252 at the same time. Therefore, if the logical addresses of different logical zones is accessed by the host system 1000 frequently, the memory controller 104 (or the memory management circuit 202) may need to frequently switch between the corresponding logical address mapping table (i.e. storing the updated logical address mapping table back to the rewritable non-volatile memory module 106 and loading the logical address mapping table among the logical zone of the logical address to be accessed to the buffer memory 252), thereby significantly affecting access performance of the memory storage apparatus 100. Accordingly, in the present exemplary embodiment, the memory controller 104 (or the memory management circuit 202) further establishes a temp mapping table for recording the mapping relations of a potion of the physical program units and the logical addresses. In particular, during the writing operation, if the corresponding logical address mapping tables are not stored in the buffer memory 252, the memory controller 104 (or the memory storage management circuit 202) may record the logical address mapped with the present physical program unit in the temp mapping table, so that the operation of frequently switching between the logical address mapping tables may be prevented.

FIG. 13 is a schematic diagram illustrating a temp mapping table according to an exemplary embodiment of the present invention.

Referring to FIG. 13, a temp mapping table 1300 includes a physical address index field 1302 and a logical address field 1304. The physical address index field 1302 is configured for recording the reference number of the physical program unit used for writing data, and the logical address field 1304 is configured for recording the reference number of the logical address mapped with the physical program unit being written with data. In particular, the temp mapping table 1300 may only record a predetermined amount of the mapping records. Therefore, whenever the temp mapping table is full, the memory controller 104 (or the memory storage management circuit 202) updates the corresponding logical address mapping table according to the temp mapping table, and then erases the records in the temp mapping table 1300, so that the mapping relations corresponding the next writing operation may be recorded thereto. However, the invention is not limited thereto. In another exemplary embodiment, the memory controller 104 (or the memory management circuit 202) may also establishes another temp mapping table for recording the mapping relations corresponding to next writing operation when the temp mapping table 1300 is full. That is, in the present exemplary embodiment, the physical address storage status table records information of all physical program units of the physical erase unit, whereas the temp mapping table records the mapping relations of a portion of the physical program units. For example, the amount of the mapping records that the temp mapping table may record is designed based on the size of the buffer memory 252.

FIGS. 14 to 20 are schematic diagrams illustrating a updating operation of the temp mapping table when writing multiple data from a host system according to an exemplary embodiment of the present invention. For the convenience of illustration, it is assumed that temp mapping table may only record up to 7 mapping records.

Figure 14:
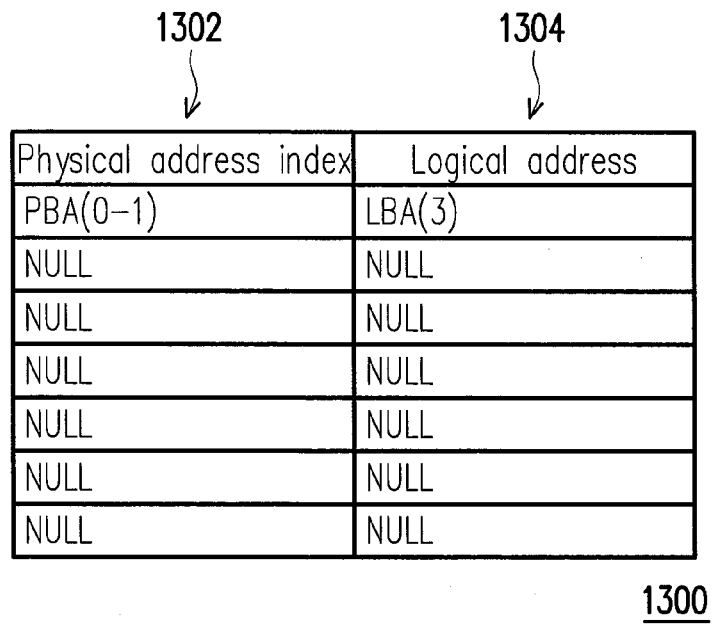

Referring to FIG. 14, if the host system 1000 stores data to the logical address LBA(3) of the logical zone LZ(0) when the logical address mapping table corresponding to the logical zone LZ(0) is not stored in the buffer memory 252, the memory controller 104 (or the memory management circuit 202) selects a physical erase unit (e.g. the physical erase unit 304(0)) and writes data into the physical program unit PBA (0-1) of the physical erase unit 304(0). In this case, the mapping record indicating that the logical address LBA(3) is mapped to the physical program unit PBA(0-1) is recorded in the temp mapping table 1300.

Figure 15:
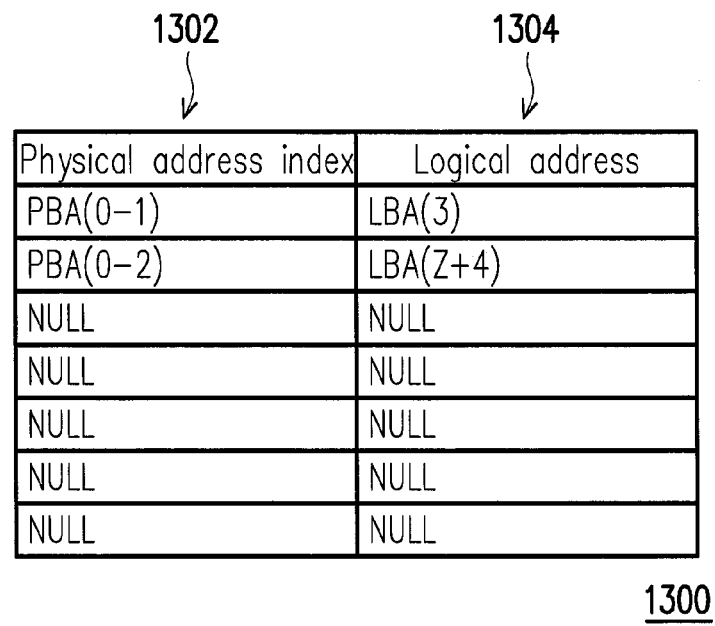

Referring to FIG. 15, next, if the host system 1000 stores data to the logical address LBA(Z+4) of the logical zone LZ(1) when the logical address mapping table corresponding to the logical zone LZ(1) is not stored in the buffer memory 252, the memory controller 104 (or the memory management circuit 202) writes data into the physical program unit PBA (0-2) of the physical erase unit 304(0). In this case, the mapping record indicating that the logical address LBA(Z+4) is mapped to the physical program unit PBA(0-2) is recorded in the temp mapping table 1300.

Figure 16:
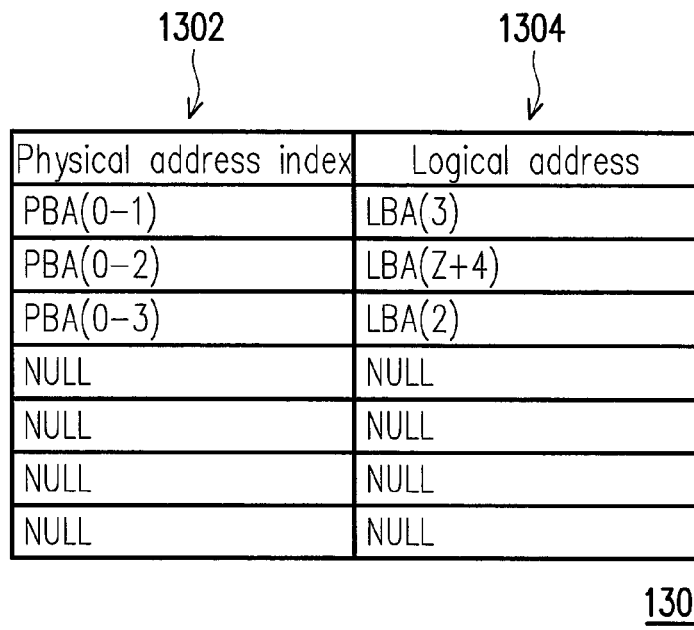

Referring to FIG. 16, next, if the host system 1000 stores data to the logical address LBA(2) of the logical zone LZ(0) when the logical address mapping table corresponding to the logical zone LZ(0) is not stored in the buffer memory 252, the memory controller 104 (or the memory management circuit 202) writes data into the physical program unit PBA(0-3) of the physical erase unit 304(0). In this case, the mapping record indicating that the logical address LBA(2) is mapped to the physical program unit PBA(0-3) is recorded in the temp mapping table 1300.

Figure 17:
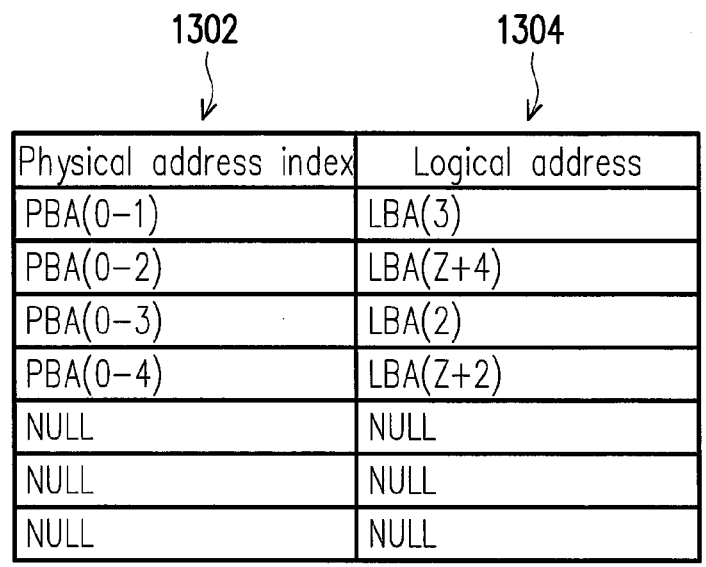

Referring to FIG. 17, next, if the host system 1000 stores data to the logical address LBA(Z+2) of the logical zone LZ(1) when the logical address mapping table corresponding to the logical zone LZ(1) is not stored in the buffer memory 252, the memory controller 104 (or the memory management circuit 202) writes data into the physical program unit PBA (0-4) of the physical erase unit 304(0). In this case, the mapping record indicating that the logical address LBA(Z+2) is mapped to the physical program unit PBA(0-4) is recorded in the temp mapping table 1300.

Figure 18:
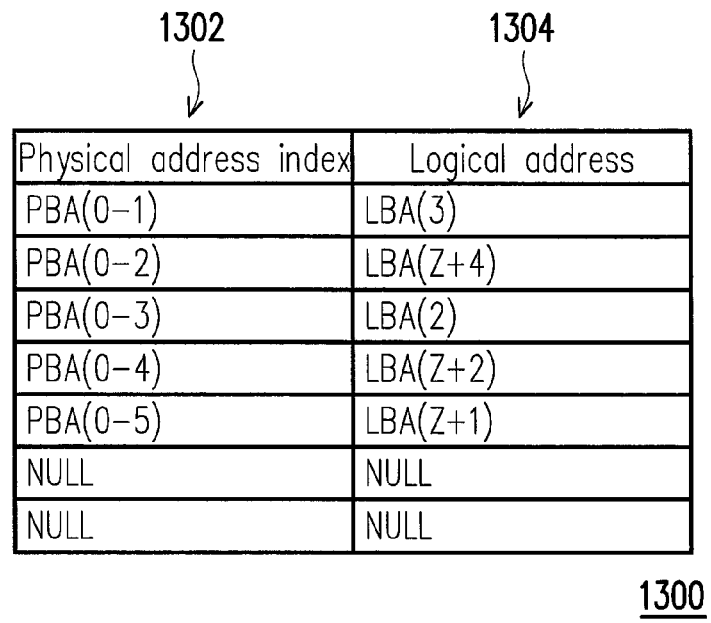

Referring to FIG. 18, next, if the host system 1000 stores the data to logical address LBA(Z+1) of the logical zone LZ(1) when the logical address mapping table corresponding to the logical zone LZ(1) is not stored in the buffer memory 252, the memory controller 104 (or the memory management circuit 202) writes data into the physical program unit PBA(0-5) of the physical erase unit 304(0). In this case, the mapping record indicating that the logical address LBA(Z+1) is mapped to the physical program unit PBA(0-5) is recorded in the temp mapping table 1300.

Figure 19:
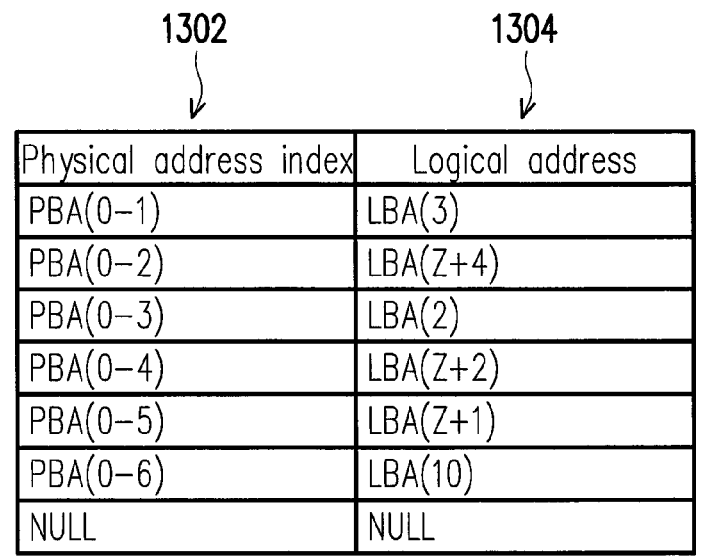

Referring to FIG. 19, next, if the host system 1000 stores data to the logical address LBA(10) of the logical zone LZ(0) when the logical address mapping table corresponding to the logical zone LZ(0) is not stored in the buffer memory 252, the memory controller 104 (or the memory management circuit 202) writes data into the physical program unit PBA(0-6) of the physical erase unit 304(0). In this case, the mapping record indicating that the logical address LBA(10) is mapped to the physical program unit PBA(0-6) is recorded in the temp mapping table 1300.

Referring to FIG. 20, next, if the host system 1000 stores data to the logical address LBA(Z+3) of the logical zone LZ(1) when the logical address mapping table corresponding to the logical zone LZ(1) is not stored in the buffer memory 252, the memory controller 104 (or the memory management circuit 202) writes data into the physical program unit PBA(0-7) of the physical erase unit 304(0). In this case, the mapping record indicating that the logical address LBA(Z+3) is mapped to the physical program unit PBA(0-7) is recorded in the temp mapping table 1300.

During the writing operations in FIG. 14 to FIG. 20, since the mapping records are recorded in the temp mapping table 1300, thus no switching of the logical address mapping tables is required even though the corresponding logical address mapping table is not stored in the buffer memory 252. As a result, the speed of data-writing may be increased.

In the present exemplary embodiment, the memory controller 104 (or the memory management circuit 202) may perform a deleting operation to the temp mapping table when the temp mapping table 1300 is full.

More specifically, the memory controller 104 (or the memory management circuit 202) sorts the mapping records recorded in the temp mapping table 1300 based on the logical zones of the logical addresses recorded in the temp mapping table 1300, and updates the corresponding logical address mapping table by logical zones, such that multiple switching of the logical address mapping table may be prevent.

FIGS. 21 to 24 are schematic diagrams illustrating a deleting operation of a temp mapping table according to an exemplary embodiment of the present invention.

Referring to FIG. 21, when the deleting operation is performed to the temp mapping table 1300 (as shown in FIG. 20) which is full, the mapping records related to the logical addresses LBA(3), LBA(2) and LBA(10) of the logical zone LZ(0) is sorted together by the memory controller 104 (or the memory management circuit 202). Next, the mapping records related to the logical addresses LBA(Z+4), LBA(Z+2), LBA(Z+1) and LBA(Z+3) of the logical zone LZ(1) is sorted together. Next, the logical address mapping table 800 corresponding to the logical zone LZ(0) is updated by the memory controller 104 (or the memory management circuit 202) according to the sorted temp mapping table 1300 (as shown in FIG. 22). Next, the logical address mapping table 810 corresponding to the logical zone LZ(1) is then being updated (as shown FIG. 23).

More specifically, in the logical address mapping table 800 corresponding to the logical zone LZ(0), the memory controller 104 (or the memory management circuit 202) performs the following operations: mapping the logical address LBA(3) to the physical program unit PBA(0-1); mapping the logical address LBA(2) to the physical program unit PBA(0-3); and mapping the logical address LBA(10) to the physical program unit PBA(0-6). Next, in the logical address mapping table 810 corresponding to the logical zone LZ(1), the memory controller 104 (or the memory management circuit 202) performs the following operations: mapping the logical address LBA(Z+4) to the physical program unit PBA(0-2); mapping the logical address LBA(Z+2) to the physical program unit PBA(0-4); mapping the logical address LBA(Z+1) to the physical program unit PBA(0-5); and mapping the logical address LBA(Z+3) to the physical program unit PBA(0-7).

In addition, the memory controller 104 (or the memory management circuit 202) further updates the physical address storage status table, which records data stored in the physical program unit PBA(0-1) to PBA(0-7) as the valid data (as shown in FIG. 24). Furthermore, the memory controller 104 (or the memory management circuit 202) deletes the mapping record in the temp mapping table 1300 to restore the status as shown in FIG. 13.

It should be noted that, in the present exemplary embodiment, the erasing operation to the temp mapping table is performed when the temp mapping table is full. However, the invention is not limited thereto. For example, the erasing operation may also be performed to the temp mapping table in the case of data merging operation, programming error situation or shut down of the memory storage apparatus 100 in order to ensure the latest mapping relations are updated to the logical address mapping table.

FIG. 25 is a flowchart illustrating an initialization of the memory storage apparatus in the data storing method according to an exemplary embodiment of the invention.

Referring to FIG. 25, in step S2501, the memory controller 104 (or the memory management circuit 202) configures a plurality of logical addresses and divides the logical addresses into a plurality of logical zones.

In step S2503, the memory controller 104 (or the memory management circuit 202) respectively establishes a plurality of logical address mapping tables for the logical zones, wherein each logical zone is corresponding to one logical address mapping table, thereby recording the mapping relations of the logical addresses in the logical zone.

Further, the memory controller 104 (or the memory management circuit 202) establishes a physical address information table for the physical program units of the physical erase unit in the memory storage apparatus 100, thereby recording whether data stored in each physical address is valid data or an invalid data in step S2505.

Next, in step S2507, the memory controller 104 (or the memory management circuit 202) establishes a temp mapping table, thereby recording the mapping relations of a potion of the physical program units.

Figure 26:
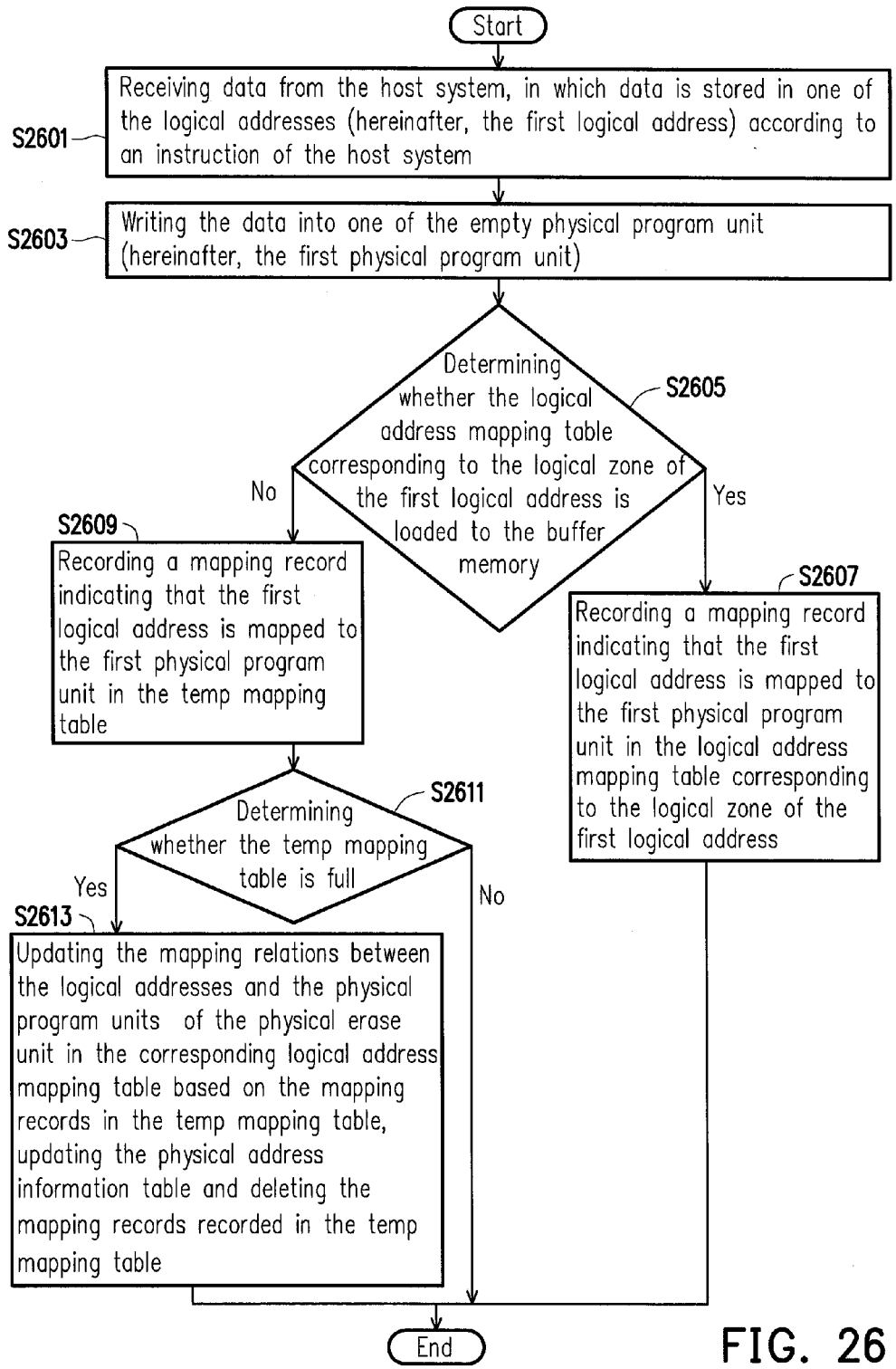
FIG. 26 is a flowchart illustrating a writing operation performed in the data storing method according to an exemplary embodiment of the present invention.

FIG. 26 is a flowchart illustrating a writing operation performed in the data storing method according to an exemplary embodiment of the present invention.

Referring to FIG. 26, in step S2601, the memory controller 104 (or the memory management circuit 202) receives data from the host system 1000, in which data is stored in one of the logical addresses (hereinafter, the first logical address) according to an instruction of the host system 1000.

In step S2603, the memory controller 104 (or the memory management circuit 202) writes data into one of the empty physical program unit (hereinafter, the first physical program unit).

In step S2605, the memory controller 104 (or the memory management circuit 202) determines whether the logical address mapping table corresponding to the logical zone of the first logical address is loaded to the buffer memory 252.

If the logical address mapping table corresponding to the logical zone of the first logical address is loaded to the buffer memory 252, the memory controller 104 (or the memory management circuit 202) directly records a mapping record indicating that the first logical address is mapped to the first physical program unit in the logical address mapping table corresponding to the logical zone of the first logical address in step S2607. Next, the process in the FIG. 26 is then terminated.

If the logical address mapping table corresponding to the logical zone of the first logical address is not loaded to the buffer memory 252, the memory controller 104 (or the memory management circuit 202) records a mapping record indicating that the first logical address is mapped to the first physical program unit in the temp mapping table in step S2609.

Next, in step S2611, the memory controller 104 (or the memory management circuit 202) determines whether the temp mapping table is full.

If the temp mapping table is not full, the process in the FIG. 26 is then terminated.

If the temp mapping table is full, in step S2613, the memory controller 104 (or the memory management circuit 202) updates the mapping relations between the logical addresses and the physical program units of the physical erase unit in the corresponding logical address mapping table based on the mapping records in the temp mapping table, then updates the physical address information table and deletes the mapping records recorded in the temp mapping table. Next, the process in the FIG. 26 is then terminated.

It should be noted that, in another exemplary embodiment of the present invention, the memory controller 104 (or the memory management circuit 202) may record the mapping relations of the physical address currently under writing by using the temp mapping table directly, without determining whether the logical address mapping table corresponding to the logical zone of the first logical address is loaded to the buffer memory 252.

Figure 27:
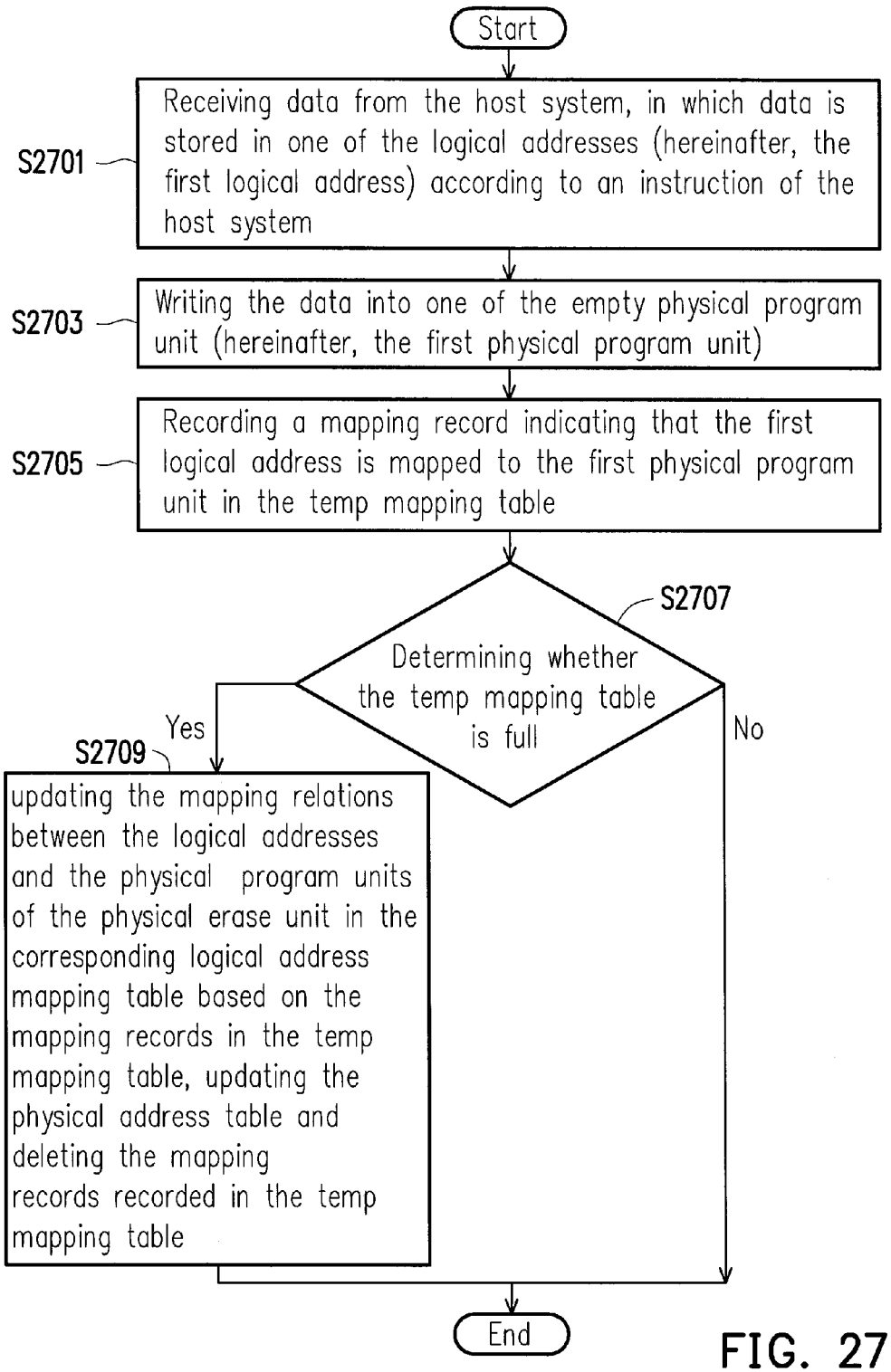
FIG. 27 is a flowchart illustrating a writing operation performed in the data storing method according to another exemplary embodiment of the present invention.

FIG. 27 is a flowchart illustrating a writing operation performed in the data storing method according to another exemplary embodiment of the present invention.

Referring to FIG. 27, in step S2701, the memory controller 104 (or the memory management circuit 202) receives data from the host system 1000, in which data is stored in one of the logical addresses (hereinafter, the first logical address) according to an instruction of the host system 1000.

In step S2703, the memory controller 104 (or the memory management circuit 202) writes data into one of the empty physical program units (hereinafter, the first physical program unit).

Next, in step S2705, the memory controller 104 (or the memory management circuit 202) records a mapping record indicating that the first logical address is mapped to the first physical program unit in the temp mapping table.

Next, in step S2707, the memory controller 104 (or the memory management circuit 202) determines whether the temp mapping table is full.

If the temp mapping table is not full, the process in the FIG. 27 is then terminated.

If the temp mapping table is full, in step S2709, the memory controller 104 (or the memory management circuit 202) updates the mapping relations between the logical addresses and the physical program units of the physical erase unit in the corresponding logical address mapping table based on the mapping records in the temp mapping table, then updates the physical address information table and deletes the mapping records recorded in the temp mapping table.

As described above, a data storing method, and a memory controller and a memory storage apparatus using the same in exemplary embodiments of the invention may effectively reduce times of switching the mapping table, thereby reducing the required time for writing data. The previously described exemplary embodiments of the present invention have the advantages aforementioned, wherein the advantages aforementioned not required in all versions of the invention.

Although the invention has been described with reference to the above embodiments, it is apparent to one of the ordinary skill in the art that modifications to the described embodiments may be made without departing from the spirit of the invention. Accordingly, the scope of the invention will be defined by the attached claims not by the above detailed descriptions.

What is claimed:

1. A data storing method for a rewritable non-volatile memory module, the rewritable non-volatile memory module has a plurality of physical erase units, and each of the physical erase units has a plurality of physical program units, the data storing method comprising:

configuring a plurality of logical addresses, and dividing the plurality of logical addresses into a plurality of logical zones;

respectively establishing a plurality of logical address mapping tables for the plurality of logical zones, wherein each of the logical zones is corresponding to one logical address mapping table;

receiving data from a host system, wherein the data is stored to a first logical address among the plurality of logical addresses according to an instruction of the host system;

writing the data into a first physical program unit among the plurality of physical program units of the plurality of physical erase units;

recording a mapping record indicating that the first logical address is mapped to the first physical program unit in a temp mapping table;

determining whether the temp mapping table is full; and if the temp mapping table is full, updating mapping relations between the plurality of logical addresses and the plurality of physical program units of the plurality of physical erase units in the plurality of logical address mapping tables based on a plurality of mapping records recorded in the temp mapping table, and deleting the plurality of mapping records recorded in the temp mapping table, wherein the mapping relations of a portion of the physical program units among the plurality of physical program units of the plurality of physical erase units are recorded in the temp mapping table.

2. The data storing method of claim 1, wherein the step of updating the mapping relations between the plurality of logical addresses and the plurality of physical program units of the plurality of physical erase units in the plurality of logical address mapping tables based on the plurality of mapping records recorded in the temp mapping table comprises:

sorting the plurality of mapping records recorded in the temp mapping table based on the plurality of logical zones of the plurality of logical addresses recorded in the temp mapping table; and sequentially updating the mapping relations between the plurality of logical addresses and the plurality of physical program units of the plurality of physical erase units in the logical address mapping table based on the sorted mapping records.

3. The data storing method of claim 1, wherein valid data belonged to a second logical address among the plurality of logical address is written into a second physical program unit among the plurality of physical program units of the plurality of physical erase units, valid data belonged to a third logical address among the plurality of logical address is written into a third physical program unit among the plurality of physical program units of the plurality of physical erase units, valid data belonged to a fourth logical address among the plurality of logical address is written into a fourth physical program unit among the plurality of physical program units of the plurality of physical erase units, valid data belonged to a fifth logical address among the plurality of logical address is written into a fifth physical program unit among the plurality of physical program units of the plurality of physical erase units, valid data belonged to a sixth logical address among the plurality of logical address is written into a sixth physical program unit among the plurality of physical program units of the plurality of physical erase units, valid data belonged to a seventh logical address among the plurality of logical address is written into a seventh physical program unit among the plurality of physical program units of the plurality of physical erase units, the first logical address, the third logical address and the sixth logical address are belonged to a first logical zone among the plurality of logical zones, and the second logical address, the fourth physical program unit, the fifth logical address and the seventh logical address are belonged to a second logical zone among the plurality of logical zones, wherein the step of sorting the plurality of mapping records recorded in the temp mapping table based on the plurality of logical zones of the plurality of logical addresses recorded in the temp mapping table comprises:

sorting the plurality of mapping records recorded in the temp mapping table based on an order of the first logical address, the third logical address, the sixth logical address, the second logical address, the fourth logical address, the fifth logical address and the seventh logical address.

4. The data storing method of claim 3, wherein the step of updating the mapping relations between the plurality of logical addresses and the plurality of physical program units in the logical address mapping tables comprises:

mapping the first logical address to the first physical program unit, mapping the third logical address to the third physical program unit and mapping the sixth logical address to the sixth physical program unit in the logical address mapping table corresponding to the first logical zone; and after the logical address mapping tables corresponding to the first logical zone is updated, mapping the second logical address to the second physical program unit, mapping the fourth logical address to the fourth physical program unit, mapping the fifth logical address to the fifth physical program unit and mapping the seventh logical address to the seventh physical program unit in the logical address mapping table corresponding to the second logical zone.

5. The data storing method of claim 1, further comprising:

establishing a physical address information table for all of the physical program units of the plurality of physical erase units, wherein information related to all of the physical program units of the plurality of physical erase units is recorded in the physical address information table.

6. The data storing method of claim 5, wherein the physical address information table is a physical address mapping table, and a logical address mapped to each of the physical program units is recorded in the physical address mapping table.

7. The data storing method of claim 5, wherein the physical address information table is a physical address storage status table, and marks for identifying whether data stored in each of the physical program units is valid data or an invalid are recorded in the physical address storage status table.

8. A data storing method for a rewritable non-volatile memory module, the rewritable non-volatile memory module has a plurality of physical erase units, and each of the physical erase units has a plurality of physical program units, the data storing method comprising:

configuring a plurality of logical addresses, and dividing the plurality of logical addresses into a plurality of logical zones;

respectively establishing a plurality of logical address mapping tables for the plurality of logical zones, wherein each of the logical zones is corresponding to one logical address mapping table;

receiving data from a host system, wherein the data is stored to a first logical address among the plurality of logical addresses according to an instruction of the host system;

writing the data to a first physical program unit among the plurality of physical program units of the plurality of physical erase units;

determining whether the logical address mapping table corresponding to the logical zone of the first logical address is loaded to a buffer memory;

if the logical address mapping table corresponding to the logical zone of the first logical address is loaded to the buffer memory, recording a mapping record indicating that the first logical address is mapped to the first physical program unit in the logical address mapping table corresponding to the logical zone of the first logical address;

if the logical address mapping table corresponding to the logical zone of the first logical address is not loaded to the buffer memory, recording the mapping record indicating that the first logical address is mapped to the first physical program unit in a temp mapping table;

determining whether the temp mapping table is full; and if the temp mapping table is full, updating mapping relations between the plurality of logical addresses and the plurality of physical program units of the plurality of physical erase units in the plurality of logical address mapping tables based on a plurality of mapping records recorded in the temp mapping table, and deleting the plurality of mapping records recorded in the temp mapping table, wherein the mapping relations of a portion of the physical program units among the plurality of physical program units of the plurality of physical erase units are recorded in the temp mapping table.

9. The data storing method of claim 8, further comprising:

establishing a physical address information table for all of the physical program units of the plurality of physical erase units, wherein information related to all of the physical program units of the plurality of physical erase units is recorded in the physical address information table.

10. A memory controller for controlling a rewritable non-volatile memory module, the rewritable non-volatile memory module has a plurality of physical erase units, and each of the physical erase units has a plurality of physical program units, the memory controller comprising:

a host interface, configured to couple to a host system;

a memory interface, configured to couple to the rewritable non-volatile memory module; and a memory management circuit, coupled to the host interface and the memory interface, wherein the memory management circuit is configured to configure a plurality of logical addresses, and divide the plurality of logical addresses into a plurality of logical zones, wherein the memory management circuit is further configured to respectively establish a plurality of logical address mapping tables for the plurality of logical zones, wherein each of the logical zones is corresponding to one logical address mapping table, wherein the memory management circuit is further configured to receive data from the host system, wherein the data is stored to a first logical address among the plurality of logical addresses according to an instruction of the host system, wherein the memory management circuit is further configured to write the data to a first physical program unit among the plurality of physical program units of the plurality of physical erase units, and record a mapping record indicating that the first logical address is mapped to the first physical program unit in a temp mapping table, wherein the memory management circuit is further configured to determine whether the temp mapping table is full, wherein if the temp mapping table is full, the memory management circuit is further configured to update mapping relations between the plurality of logical addresses and the plurality of physical program units of the plurality of physical erase units in the plurality of logical address mapping tables based on a plurality of mapping records recorded in the temp mapping table, and delete the plurality of mapping records recorded in the temp mapping table, wherein the mapping relations of a portion of the physical program units among the plurality of physical program units of the plurality of physical erase units are recorded in the temp mapping table.

11. The memory controller of claim 10, wherein during the operation of updating the mapping relations between the plurality of logical addresses and the plurality of physical program units of the plurality of physical erase units in the plurality of logical address mapping tables based on the plurality of mapping records recorded in the temp mapping table, the memory management circuit is configured to sort the plurality of mapping records recorded in the temp mapping table based on the plurality of logical zones of the plurality of logical addresses recorded in the temp mapping table, and sequentially update the mapping relation between the plurality of logical addresses and the plurality of physical program units of the plurality of physical erase units in the logical address mapping table based on the sorted mapping records.

12. The memory controller of claim 11, wherein valid data belonged to a second logical address among the plurality of logical address is written into a second physical program unit among the plurality of physical program units of the plurality of physical erase units, valid data belonged to a third logical address among the plurality of logical address is written into a third physical program unit among the plurality of physical program units of the plurality of physical erase units, valid data belonged to a fourth logical address among the plurality of logical address is written into a fourth physical program unit among the plurality of physical program units of the plurality of physical erase units, valid data belonged to a fifth logical address among the plurality of logical address is written into a fifth physical program unit among the plurality of physical program units of the plurality of physical erase units, valid data belonged to a sixth logical address among the plurality of logical address is written into a sixth physical program unit among the plurality of physical program units of the plurality of physical erase units, valid data belonged to a seventh logical address among the plurality of logical address is written into a seventh physical program unit among the plurality of physical program units of the plurality of physical erase units, the first logical address, the third logical address and the sixth logical address are belonged to a first logical zone among the plurality of logical zones, and the second logical address, the fourth physical program unit, the fifth logical address and the seventh logical address are belonged to a second logical zone among the plurality of logical zones, wherein during the operation of sorting the plurality of mapping records recorded in the temp mapping table based on the plurality of logical zones of the plurality of logical addresses recorded in the temp mapping table, the memory management circuit sorts the plurality of mapping records recorded in the temp mapping table based on an order of the first logical address, the third logical address, the sixth logical address, the second logical address, the fourth logical address, the fifth logical address and the seventh logical address.

13. The memory controller of claim 12, wherein during the operation of updating the mapping relations between the plurality of logical addresses and the physical program units of the plurality of erasing units in the logical address mapping table based on the sorted mapping records, the memory management circuit is configured to map the first logical address to the first physical program unit, map the third logical address to the third physical program unit and map the sixth logical address to the sixth physical program unit in the logical address mapping table corresponding to the first logical zone; and after the logical address mapping table corresponding to the first logical zone is updated, the memory management circuit is configured to map the second logical address to the second physical program unit, map the fourth logical address to the fourth physical program unit, map the fifth logical address to the fifth physical program unit and map the seventh logical address to the seventh physical program unit in the logical address mapping table corresponding to the second logical zone.

14. The memory controller of claim 10, wherein the memory management circuit is further configured to establish a physical address information table for all of the physical program units of the plurality of physical erase units, and information related to all of the physical program units of the plurality of physical erase units is recorded in the physical address information table.

15. The memory controller of claim 14, wherein the physical address information table is a physical address mapping table, and a logical address mapped to each of the physical program units is recorded in the physical address mapping table.

16. The memory controller of claim 14, wherein the physical address information table is a physical address storage status table, and marks for identifying whether data stored in each of the physical program units is valid data or an invalid are recorded in the physical address storage status table.

17. A memory controller for controlling a rewritable non-volatile memory module, the rewritable non-volatile memory module has a plurality of physical erase units, and each of the physical erase units has a plurality of physical program units, the memory controller comprising:

a buffer memory;
a host interface, configured to couple to a host system;
a memory interface, configured to couple to the rewritable non-volatile memory module; and
a memory management circuit, coupled to the buffer memory, the host interface and the memory interface,
wherein the memory management circuit is configured to configure a plurality of logical addresses, and divide the plurality of logical addresses into a plurality of logical zones,
wherein the memory management circuit is further configured to respectively establish a plurality of logical address mapping tables for each of the plurality of logical zones, wherein each of the logical zones is corresponding to one logical address mapping table,
wherein the memory management circuit is further configured to receive data from the host system, wherein the data is stored to a first logical address among the plurality of logical addresses according to an instruction of the host system,
wherein the memory management circuit is further configured to write the data to a first physical program unit among the plurality of physical program units of the plurality of physical erase units,
wherein the memory management circuit is further configured to determine whether the logical address mapping table corresponding to the logical zone of the first logical address is loaded to the buffer memory,
wherein if the logical address mapping table corresponding to the logical zone of the first logical address is loaded to the buffer memory, the memory management circuit is further configured to record a mapping record indicating that the first logical address is mapped to the first physical program unit in the logical address mapping table corresponding to the logical zone of the first logical address,
wherein if the logical address mapping table corresponding to the logical zone of the first logical address is not loaded to the buffer memory, the memory management circuit is further configured to record the mapping record indicating that the first logical address is mapped to the first physical program unit in a temp mapping table;
wherein the memory management circuit is further configured to determine whether the temp mapping table is full,
wherein if the temp mapping table is full, the memory management circuit is further configured to update mapping relations between the plurality of logical addresses and the plurality of physical program units of the plurality of physical erase units in the plurality of logical address mapping tables based on a plurality of mapping records recorded in the temp mapping table, and delete the plurality of mapping records recorded in the temp mapping table,
wherein the mapping relations of a portion of the physical program units among the plurality of physical program units of the plurality of physical erase units are recorded in the temp mapping table.

18. A memory storage apparatus, comprising:
a connector, configured to couple to a host system;
a rewritable non-volatile memory module, having a plurality of physical erase units, wherein each of the physical erase units has a plurality of physical program units; and
a memory controller, coupled to the connector and the rewritable non-volatile memory,
wherein the memory controller is configured to configure a plurality of logical addresses, and divide the plurality of logical addresses into a plurality of logical zones,
wherein the memory controller is further configured to respectively establish a plurality of logical address mapping tables for each of the plurality of logical zones,
wherein each of the logical zones is corresponding to one logical address mapping table,
wherein the memory controller is further configured to receive data from the host system, wherein the data is stored to a first logical address among the plurality of logical addresses according to an instruction of the host system,
wherein the memory controller is further configured to write the data to a first physical program unit among the plurality of physical program units of the plurality of physical erase units, and recording a mapping record indicating that the first logical address is mapped to the first physical program unit in a temp mapping table,
wherein the memory controller is further configured to determine whether the temp mapping table is full,
wherein if the temp mapping table is full, the memory controller is further configured to update mapping relations between the plurality of logical addresses and the plurality of physical program units of the plurality of physical erase units in the plurality of logical address mapping tables based on a plurality of mapping records recorded in the temp mapping table, and deleting the plurality of mapping records recorded in the temp mapping table,
wherein the mapping relations of a portion of the physical program units among the plurality of physical program units of the plurality of physical erase units are recorded in the temp mapping table.

19. The memory storage apparatus of claim 18, wherein during the operation of updating the mapping relation between the plurality of logical addresses and the plurality of physical program units of the plurality of physical erase units in the plurality of logical address mapping tables based on the plurality of mapping records recorded in the temp mapping table, the memory controller is configured to sort the plurality of mapping records recorded in the temp mapping table based on the plurality of logical zones of the plurality of logical addresses recorded in the temp mapping table, and sequentially update the mapping relations between the plurality of logical addresses and the plurality of physical program units of the plurality of physical erase units in the logical address mapping table based on the sorted mapping records.

20. The memory storage apparatus of claim 18, wherein valid data belonged to a second logical address among the plurality of logical address is written into a second physical program unit among the plurality of physical program units of the plurality of physical erase units, valid data belonged to a third logical address among the plurality of logical address is written into a third physical program unit among the plurality of physical program units of the plurality of physical erase units, valid data belonged to a fourth logical address among the plurality of logical address is written into a fourth physical program unit among the plurality of physical program units of the plurality of physical erase units, valid data belonged to a fifth logical address among the plurality of logical address is written into a fifth physical program unit among the plurality of physical program units of the plurality of physical erase units, valid data belonged to a sixth logical address among the plurality of logical address is written into a sixth physical program unit among the plurality of physical program units of the plurality of physical erase units, valid data belonged to a seventh logical address among the plurality of logical address is written into a seventh physical program unit among the plurality of physical program units of the plurality of physical erase units, the first logical address, the third logical address and the sixth logical address are belonged to a first logical zone among the plurality of logical zones, and the second logical address, the fourth logical address, the fifth logical address and the seventh logical address are belonged to a second logical zone among the plurality of logical zones, wherein during the operation of sorting the plurality of mapping records recorded in the temp mapping table based on the plurality of logical zones of the plurality of logical addresses recorded in the temp mapping table, the memory controller sorts the plurality of mapping records recorded in the temp mapping table based on an order of the first logical address, the third logical address, the sixth logical address, the second logical address, the fourth logical address, the fifth logical address and the seventh logical address.

21. The memory storage apparatus of claim 18, wherein during the operation of updating the mapping relation between the plurality of logical addresses and the plurality of physical program units in the logical address mapping tables, the memory controller is configured to map the first logical address to the first physical program unit, map the third logical address to the third physical program unit and map the sixth logical address to the sixth physical program unit in the logical address mapping table corresponding to the first logical zone; and after the logical address mapping table corresponding to the first logical zone is updated, the memory controller is configured to map the second logical address to the second physical program unit, map the fourth logical address to the fourth physical program unit, mapping the fifth logical address to the fifth physical program unit and map the seventh logical address to the seventh physical program unit in the logical address mapping table corresponding to the second logical zone.

22. The memory storage apparatus of claim 18, wherein the memory controller is further configured to establish a physical address information table for all of the physical program units of the plurality of physical erase units, and an information of all of the physical program units of the plurality of physical erase units is recorded in the physical address information table.

23. The memory storage apparatus of claim 22, wherein the physical address information table is a physical address mapping table, and a logical address mapped to each of the physical program units is recorded in the physical address mapping table.

24. The memory storage apparatus of claim 22, wherein the physical address information table is a physical address storage status table, and marks for identifying whether data stored in each of the physical program units is valid data or an invalid are recorded in the physical address storage status table.

25. A memory storage apparatus, comprising:
    a connector, configured to couple to a host system;
    a rewritable non-volatile memory module, having a plurality of physical erase units, wherein each of the physical erase units has a plurality of physical program units; and
    a memory controller, coupled to the connector and the rewritable non-volatile memory, and having a buffer memory,
wherein the memory controller is configured to configure a plurality of logical addresses, and divide the plurality of logical addresses into a plurality of logical zones,
wherein the memory controller is further configured to respectively establish a plurality of logical address mapping tables for each of the plurality of logical zones, wherein each of the logical zones is corresponding to one logical address mapping table,
wherein the memory controller is further configured to receive data from the host system, wherein the data is stored to a first logical address among the plurality of logical addresses according to an instruction of the host system,
wherein the memory controller is further configured to write the data to a first physical program unit among the plurality of physical program units of the plurality of physical erase units,
wherein the memory controller is further configured to determine whether the logical address mapping table corresponding to the logical zone of the first logical address is loaded to the buffer memory,
wherein if the logical address mapping table corresponding to the logical zone of the first logical address is loaded to the buffer memory, the memory controller is further configured to map the first logical address to the first physical program unit in the logical address mapping table corresponding to the logical zone of the first logical address,
wherein if the logical address mapping table corresponding to the logical zone of the first logical address is not loaded to the buffer memory, the memory controller is further configured to record a mapping record indicating the first logical address is mapped to the first physical program unit in a temp mapping table,
wherein the memory controller is further configured for determining whether the temp mapping table is full,
wherein if the temp mapping table is full, the memory controller is further configured to update mapping relations between the plurality of logical addresses and the plurality of physical program units of the plurality of physical erase units in the plurality of logical address mapping tables based on a plurality of mapping records recorded in the temp mapping table, and delete the plurality of mapping records recorded in the temp mapping table,
wherein the mapping relations of a portion of the physical program units among the plurality of physical program units of the plurality of physical erase units are recorded in the temp mapping table.

\* \* \* \* \*